United States Patent [19]

Hayashi

[11] Patent Number: 4,869,633
[45] Date of Patent: Sep. 26, 1989

[54] LOCKING LUG NUT FOR WHEELS AND TIRES

[76] Inventor: Haruhiko Hayashi, 1486-26th Ave., San Francisco, Calif. 94112

[21] Appl. No.: 218,685

[22] Filed: Jul. 13, 1988

Related U.S. Application Data

[63] Continuation of Ser. No. 740,905, Dec. 10, 1986, abandoned.

[51] Int. Cl.$^4$ .................... F16B 33/00; F16B 37/08
[52] U.S. Cl. ..................... 411/368; 411/432; 411/533; 411/900; 301/114
[58] Field of Search ............ 411/185, 186, 368–370, 411/532, 900, 429, 432, 533; 10/86 R, 86 A, 86 F; 301/114, 115

[56] References Cited

U.S. PATENT DOCUMENTS

| | | | |
|---|---|---|---|
| 2,597,835 | 5/1952 | Eksergian | 411/368 |
| 3,386,771 | 6/1968 | Verdier | 411/533 |
| 3,930,428 | 1/1976 | Hale | 411/910 |
| 4,201,110 | 5/1980 | Hanai et al. | 411/429 |
| 4,362,449 | 12/1982 | Hlinsky | 411/368 |
| 4,574,602 | 3/1986 | Furuse | 411/429 |

FOREIGN PATENT DOCUMENTS 2138529 10/1984 United Kingdom ............ 411/533

Primary Examiner—Neill R. Wilson
Attorney, Agent, or Firm—Limbach, Limbach & Sutton

[57] ABSTRACT

A lug nut device is provided to enable an adjustable, durable and lockable connection between a wheel and an axle of a vehicle. The lug nut device includes two components, a lug nut composed of hardened metal and a tapered washer composed of aluminum. The lug nut is comprised of a plurality of arbitrarily arranged rounded and flat sides. The tapered washer has a large surface area, allowing for self-centering and weight distribution. The tapered washer and lug nut are connected by press-fitting the base of the lug nut to the flat end of the tapered washer. The two components then are fixedly engaged to a bolt, adjustably connecting the wheel to the axle. The lug nut device is more securely fastened by the means of a socket or key whose interior cavity circumference is complimentary to the sides of the lug nut.

7 Claims, 1 Drawing Sheet

LOCKING LUG NUT FOR WHEELS AND TIRES

This is a continuation of Application Serial No. 06/940,905, filed Dec. 10, 1986.

DESCRIPTION

TECHNICAL FIELD

This invention generally relates to lug nuts for wheels and tires and more particularly to a lug nut which is lockable yet is easily unlocked by the use of a key.

BACKGROUND ART

Lockable lug nuts have been used on vehicle wheels to prevent tire theft and to insure the stable attachment of the wheel to the vehicle axle. The conventional lockable lug nut is available in three forms. The first form is composed of a lug nut with a hollow depression at its top with an irregularly surfaced interior insert. The lock or key with a compatible irregular surface is inserted into the nut and force applied to lock or unlock the nut threaded on the lug bolt.

The second conventional lockable lug nut consists of similar construction, though taller than the norm. The interior of the lug nut is threaded, with two opposing interior indentations located at one end of the lug nut. The key is affixed to the cavity apex of a socket, similar to that regularly used in conjunction with a socket wrench. The key has two retractable protrusions located near its base. The socket with the key, when inserted, covers the lug nut. The protrusions engage the indentations and lock the socket with key in place. Force in the form of rotary motion is then applied to fasten or unfasten the nut.

A third form of the prior art is a lug nut and washer apparatus, where the lug nut covers a key and the key engages the washer. The key is cylinder shaped with a flat disc base. A multitude of short prongs are mounted on the underside of the base. The prongs engage corresponding holes on the washer, which then abuts the corresponding holes on the washer, then abuts the key and covering nut. Force is exerted to engage the key and washer which in turn fastens or unfastens the lug nut and washer apparatus to the bolt.

These conventional lug nuts are inadequate in many respects. The locking feature is easily broken by the application of an improper key or by excessive force. Thus, the broken lug nut permanently connects the wheel to the axle and needs to be removed by a costly and time consuming process. Another problem with the conventional lockable lug nut is the difficulty in precisely applying a specified amount of force to the nut. The structure of the conventional lockable lug nuts often dictates that less than the prescribed amount of torque be applied. An application of excessive force may cause a prong to break as in the third prior art example or the irregular interior insert to crack as in the first example, as neither the prongs nor insert are strong.

Another drawback to the conventional lockable lug nut are the available keys. The ordinary lockable lug nut type has a hollow depression at its top with an irregular interior surface. An alternate arrangement is the prong form. The key's surface or prongs are arranged in a corresponding irregular manner so that a particular key can be inserted and fit only a specific locking lug nut combination. In practice there are only fifteen combinations of keys and lug nuts; thus, the variations are limited. Furthermore, it is difficult to visually determine what key will fit a particular lug nut.

A further problem with the conventional locking lug nut is the inability to adjust its weight should it be heavier than the other lug nuts used on a wheel. The wheel may become unbalanced and vehicle performance impaired. A counterweight fixed on the tire rim at a position opposite to that of the heavy conventional locking lug nut is necessary to counteract the excessive weight and to restore wheel balance.

It is therefore an object of the present invention to provide a locking lug nut which is lightweight and easily alignable.

Another object of the present invention is to provide a locking lug nut which is durable and not easily broken by either force or an incorrect key.

A further object of the present invention is to provide a lug nut which is adjustable to the desirable wheel weight.

Another object of the present invention is to provide a wide variety of lug nut and key combinations.

DISCLOSURE OF THE INVENTION

The foregoing objects and advantages of the present invention are apparent from the ensuing disclosure, in which a preferred embodiment is illustrated in the accompanying drawings. It is contemplated that variations in device features may occur to the skilled craftsman without departing from the spirit of the present invention and without exceeding the scope of the appended claims.

The present invention is a locking lug nut device comprising two separate components. The first component is a keyed nut portion, preferably composed of a heat treated steel alloy. The second component is a tapered washer portion, preferably of aluminum. The lug nut comprises an exterior surface area, with a plurality of rounded and flat sides of similar dimensions, which are arbitrarily and circumferentially arranged so that at all times a flat side opposes to a rounded side, a threaded interior cavity, and a base lip. The washer is essentially round with convex surface end, and a flat surface end which engages the lug nut. The washer has a cavity which is cone shaped, gradually tapering at an angle to an opening. The washer has an interior perimeter indentation located near the flat surface end. In use, convex surface end of the washer is aligned with a lug hole in the vehicle wheel, and is placed over a bolt on the axle hub, enabling the lug nut to be selfcentering. The lockable lug nut and tapered washer are attached by means of press-fitting the base lip of the lug nut to the interior perimeter indentation of the washer. The lockable lug nut device is threaded onto the bolt and is securely fastened to the bolt by the application of a socket wrench or key which is complimentary to the circumferentially arranged sides of the lug nut. The key fits over the lug nut and the lug nut is tightened by applying torque to the key, thereby fixedly engaging and retaining the bolt at a given orientation, and provides means for adjustably connecting the wheel to the axle.

The advantages of the present invention are multiple. The locking lug nut device is light weight. Due to its dual composition, each component may be weighted differently. It is durable and hard to break by the excessive use of force or an improper key. A further advantage to the device is that it is easily alignable with the lug holes and bolts of a vehicle wheel. The variety of arrangements of flat and rounded sides is great, enabling a wider range of locking lug nut and washer variations.

These and other features, objectives and advantages of the present invention will be more readily understood upon consideration of the following detailed description of certain embodiments of the present invention and the accompanying drawings.

BEST MODE FOR CARRYING OUT THE INVENTION

The present invention provides an improved device for the stable attachment of wheels to axles. The device is capable of being used on a variety of wheels having different dimensions. The device will be described in detail by reference to the drawings.

Figure 1:
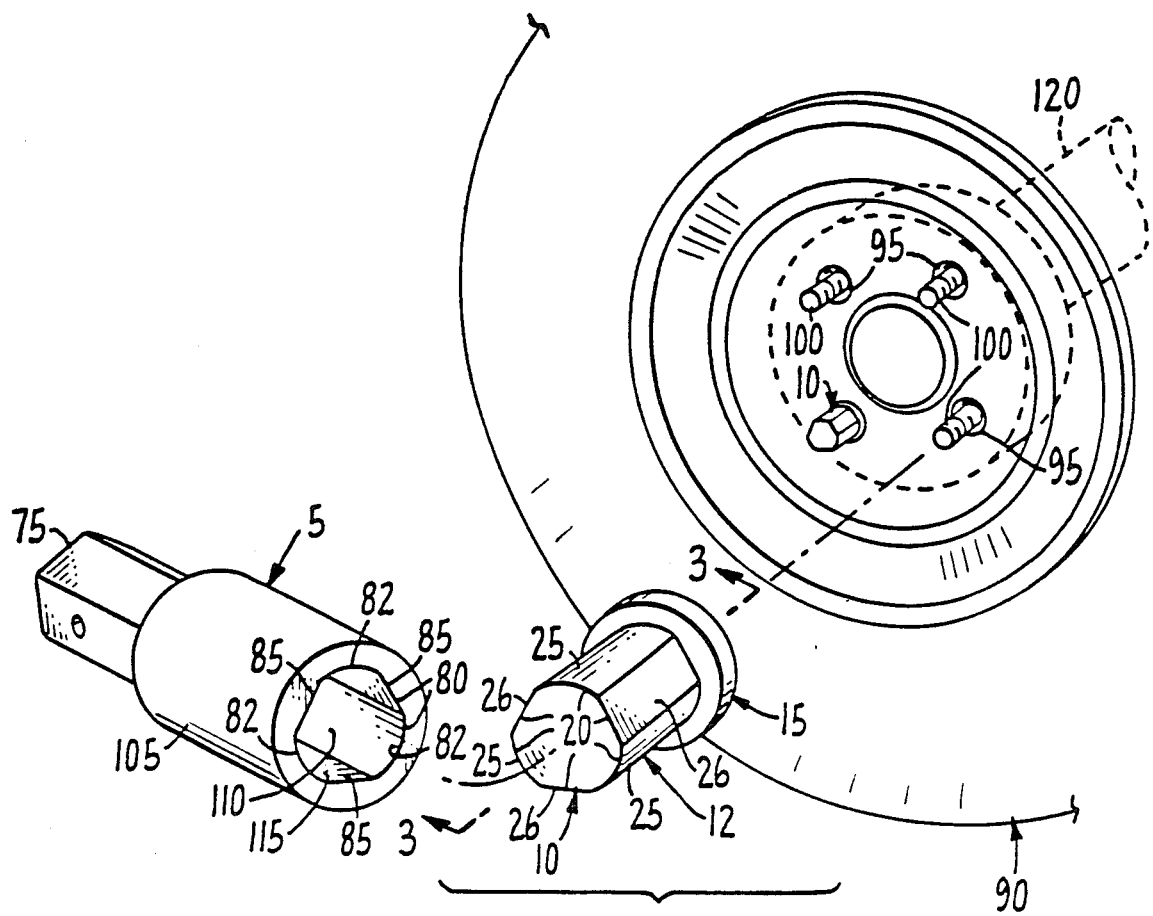
FIG. 1 is a perspective view of a preferred embodiment of the present invention with a wheel and axle shown in phantom lines.

Referring to FIG. 1, a locking lug nut device 10 is shown, depicting two components, a lug nut 12 and a tapered washer 15. The lug nut 12 has an exterior surface area composed of sides 20 which are arbitrarily arranged. The sides 20 are both rounded sides 25 and flat sides 26, which are of similar dimensions. The lug nut 12 has a threaded interior cavity 50, a base lip 45 and a base 42. The lug nut 12 is connected to the tapered washer 15. As can be seen from FIG. 3, the interior cavity 50 is fully threaded; i.e. over its entire length.

The lug nut device 10 is aligned with a lug hole 95 in a vehicle wheel 90. A bolt 100 passes through the lug hole 95. The lug nut device 10 is threaded onto the bolt 100, and torqued to the appropriate pounds per inch, thereby fixedly engaging and retaining the bolt 100 at a given orientation.

The lug nut device 10 is threaded and fastened to the bolt 100 by a key 5. The key has a faceted member 75 which is joined to a sleeve member 105. The sleeve member 105 encloses a cavity 110. The surface 115 of the cavity 110 has sides 80, which are rounded 82 and straight 85. The sides 80 of the cavity 110 are complimentary to the sides 20 of the lug nut 12.

The key 5 covers the lug nut device 10 threaded on the bolt 100. Force is applied to the key 5 and the lug nut device 10 is securely fastened to the bolt 100, thereby ensuring the stable attachment of the wheel 90 to the axle 120.

Figure 2:
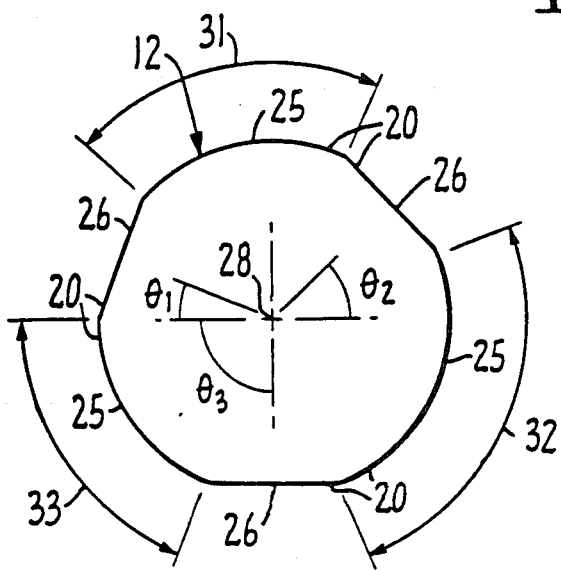
FIG. 2 is an end view of a lockable lug nut in accordance with the present invention.

FIG. 2 shows an end view of the lug nut 12 with the sides 20 apparent. The sides 20 are arbitrarily and circumferentially arranged so that a flat side 26 opposes a rounded side 25. The sides 20 are arranged in such a manner so that an oridinary crescent wrench cannot grasp the lug nut 12, thus removing it from the bolt 100.

The sides 20 are arbitrarily arranged about an axial line 28 which extends through the lug nut 12. An angle 30, 31 or 32 of a side 20 determines its size. The arrangement of the angles 30, 31 and 32 differ in degree. In the preferred embodiment of the invention, 30, 31 and 32, the arrangement of different angles provides a variety of different sized sides 20 and thus for different lug nut 12 and key 5 combinations.

Figure 3:
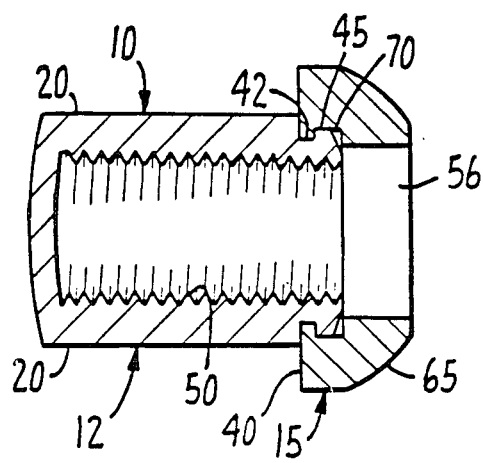
FIG. 3 is a cut-away view of the lockable lug nut and washer in accordance with the present invention.

Referring to FIG. 3, the lug nut device 10 is shown with the lug nut 12 and tapered washer 15 cut away.

The lug nut 12 can be composed of any hardened metal so as to provide a durable fastening device. The tapered washer 15 is composed of aluminum which makes the tapered washer 15 light weight.

As such, it can be appreciated that a lug nut device 10 constructed entirely of the material used for lug nut 12 or entirely of the material used for tapered washer 15 has an overall weight that is substantially different from that of the other lug nuts used on the wheel.

The two component nature of the lug nut device 10 allows for the separate weight adjustment of the lug nut 12 and tapered washer 15. The separate nature of the lug nut 12 and tapered washer 15 allows for individual adjustability of the components.

As shown in FIGS. 1 and 3, the tapered washer 15 attaches to the lug nut 12 so as to form a locking lug nut device 10. FIG. 3 shows the tapered washer 15 having a convex surface end 65 which is aligned with and abuts the lug hole 95. The tapered washer 15 is hollow with openings 56 at either end. An interior perimeter indentation 70 of the tapered washer 15 allows connection of the base lip 45 of the lug nut 12 by means of press-fitting. As can be seen from FIG. 3, the base lip 45 of the lug nut 12 is formed on the outer surface of the lug nut 12. This permits the interior cavity 50 of the lug nut 12 and the bolts 100 to have conventional complementary cylindrical shapes. The press-fit connection allows the tapered washer 15 and lug nut 12 to be permanently attached yet easily disassembled. The opposing flat end 40 of the tapered washer 15 flushly abuts the base 42 of the lug nut 12.

The preferred embodiment of the locking lug nut device 10 as reflected in FIG. 3 allows for the separate weight adjustment of the lug nut 12 and the tapered washer 15. Although the metallic composition of these components has been suggested, it is contemplated that different materials as may occur to one skilled in the art may be used to compose the lug nut 12 and tapered washer 15.

A further advantage of the invention as evidenced in FIG. 3 is the convex surface end 65 of the tapered washer 15 which provides for the easy self-centering of the lug nut 12 and the lug nut device 10. The convex surface end 65 of the tapered washer 15 also provides for the better weight distribution of the wheel 90.

Although the foregoing invention has been described in some detail by way of illustration and example, for purposes of clarity of understanding, it will be obvious to one skilled in the art that certain modifications may be practiced.

I claim:

1. An improved locking lug nut to secure a wheel to a vehicle axle hub, wherein the wheel includes lug holes which engage bolts mounted on the axle hub, and further wherein the locking lug nut can be threaded onto at least one of the bolts and other lug nuts can be threaded onto the bolts to secure the wheel against the axle hub thereby fixedly retaining the wheel to the axle hub at a given orientation, the improvement comprising a plurality of flat and rounded sides formed on the outer surface of the locking lug nut, wherein each of the flat sides is opposed at all times by one of the rounded sides of said locking lug nut, and further wherein said locking lug nut is constructed of a nut portion and a washer portion, and said nut portion is constructed of a hardened material and said washer portion is constructed of a different material which is selected so that the locking lug nut has an overall weight which approaches that of the other lug nuts, and further wherein the hardened material and the different material have the property that a locking lug nut constructed entirely of the different material or entirely of the hardened metal has an overall weight substantially different from that of the other lug nuts.

2. The improved device as recited in claim 1, wherein the plurality of flat and rounded sides are arbitrarily arranged.

3. The improved device as recited in claim 1, wherein said nut portion is formed of heat-treated steel alloy and said washer portion is formed of aluminum.

4. The improved device as recited in claim 1, further including key means for tightening the lug nut onto said bolt 5. The improved device as recited in claim 4, wherein said key means has a plurality of flat and rounded interior sides, each side of similar dimensions.

6. The improved device as recited in claim 5, wherein said interior sides are circumferentially arranged in a manner substantially identical to the arbitrarily arranged sides of said lug nut.

7. The improved device as recited in claim 1, wherein said nut portion has a fully-threaded interior cavity and a base lip formed in the outer surface of said nut portion, and said washer portion has an interior perimeter indentation, and further wherein said lug nut and said washer portion are connected by press-fitting said base lip of said lug nut to said base perimeter indentation of said washer portion.

* * * * *